United States Patent
Lin et al.

(10) Patent No.: US 10,490,120 B2
(45) Date of Patent: Nov. 26, 2019

(54) BIAS GENERATION CIRCUIT AND SYNCHRONOUS DUAL MODE BOOST DC-DC CONVERTER THEROF

(71) Applicant: Raydium Technology Corporation, Hsinchu (TW)

(72) Inventors: Shen-Xiang Lin, Taipei (TW); Hsuan-Hao Chien, Taipei (TW); Chih-Jen Hung, Taipei (TW)

(73) Assignee: Raydium Semiconductor Corporation, Hsinchu County (TW)

( * ) Notice: Subject to any disclaimer, the term of this patent is extended or adjusted under 35 U.S.C. 154(b) by 38 days.

(21) Appl. No.: 15/880,063

(22) Filed: Jan. 25, 2018

(65) Prior Publication Data

US 2018/0211588 A1  Jul. 26, 2018

Related U.S. Application Data

(60) Provisional application No. 62/450,608, filed on Jan. 26, 2017.

(51) Int. Cl.
| | |
|---|---|
| *G09G 3/3208* | (2016.01) |
| *H02M 3/156* | (2006.01) |
| *H02M 3/07* | (2006.01) |
| *H02M 3/158* | (2006.01) |
| *H02M 1/00* | (2006.01) |

(52) U.S. Cl.
CPC ............ *G09G 3/3208* (2013.01); *H02M 3/07* (2013.01); *H02M 3/1563* (2013.01); *H02M 3/1588* (2013.01); *G09G 2330/02* (2013.01); *G09G 2330/028* (2013.01); *H02M 2001/007* (2013.01); *Y02B 70/1466* (2013.01)

(58) Field of Classification Search
CPC ... G09G 3/3208–3291; G09G 2330/02; G09G 2330/028; H02M 3/07; H02M 3/1563; H02M 2001/007; H02M 2001/0045
See application file for complete search history.

(56) References Cited

U.S. PATENT DOCUMENTS

| | | | | |
|---|---|---|---|---|
| 2009/0315484 A1* | 12/2009 | Cegnar | ............... | H05B 33/0818 315/307 |
| 2011/0025673 A1* | 2/2011 | Chen | ..................... | H02M 3/156 345/211 |
| 2012/0223693 A1* | 9/2012 | Tang | ..................... | H02M 3/157 323/283 |
| 2015/0116300 A1* | 4/2015 | Yamaki | ................ | G09G 3/3696 345/212 |
| 2017/0279352 A1* | 9/2017 | Kosaraju | .......... | G01R 19/16571 |

* cited by examiner

*Primary Examiner* — Laurence J Lee

(57) ABSTRACT

A bias generation circuit coupled to a display panel is disclosed. The bias generation circuit includes a linear regulator, a charge pump and a synchronous dual mode boost DC-DC converter. The linear regulator and the charge pump are coupled to the display panel respectively. The synchronous dual mode boost DC-DC converter is selectively operated in a pulse width modulation mode or a pulse frequency modulation mode according to a control signal. In the pulse width modulation mode, the synchronous dual mode boost DC-DC converter controls the linear regulator to generate a first voltage signal to the display panel. In the pulse frequency modulation mode, the synchronous dual mode boost DC-DC converter controls the charge pump to generate a second voltage signal to the display panel.

6 Claims, 3 Drawing Sheets

BIAS GENERATION CIRCUIT AND SYNCHRONOUS DUAL MODE BOOST DC-DC CONVERTER THEROF

CROSS-REFERENCE TO RELATED APPLICATIONS

This Application claims the benefit of U.S. Provisional Application 62/450,608 filed on Jan. 26, 2017.

BACKGROUND

Field

The disclosure relates to a display panel; in particular, to a bias generation circuit and a synchronous dual mode boost DC-DC converter thereof applied to an OLED display panel.

Description of the Related Art

As shown in FIG. 1, when the conventional OLED display panel PL (e.g., AMOLED display panel) is operated in normal mode, the bias integrated circuit BIC usually provides the voltage signal VCI to the source driver SD and provides the voltage signals OVDD and OVSS to the OLED display panel PL; however, when the OLED display panel PL is operated in idle mode, the charge pump disposed in the source driver SD provides the voltage signals OVDD and OVSS to the OLED display panel PL.

The reason for performing this voltage source switch is that the current loading in the idle mode is too light, and the synchronous boost DC-DC converter in the bias integrated circuit BIC only operated in pulse-width modulation mode has poor conversion efficiency in the idle mode. Therefore, if the charge pump disposed in the source driver SD provides the voltage signals OVDD and OVSS to the OLED display panel PL, the conversion efficiency can be enhanced.

However, this voltage source switch may cause one or more of the following problems:

(1) Because different bias integrated circuits BIC and source drivers SD may have different switching timings, there will be system cooperation issue.

(2) As shown in FIG. 2, after this voltage source switch is done at the switch time TSW, the voltage signal OVDD provided to the OLED display panel PL may be affected to have undershoot UST and the voltage signal OVSS provided to the OLED display panel PL may be affected to have overshoot OST.

(3) In order to provide the voltage signals OVDD and OVSS by the source driver SD in the idle mode, the charge pump should be disposed in the source driver SD, and the cost will be increased.

There is a need, therefore, to address one or more of the above-mentioned problems caused by this voltage source switch.

SUMMARY

In one embodiment, this disclosure provides a bias generation circuit and a synchronous dual mode boost DC-DC converter thereof to address one or more of the above-mentioned problems.

In one embodiment, a bias generation circuit is coupled to a display panel. The bias generation circuit includes a linear regulator, a charge pump and a synchronous dual mode boost DC-DC converter. The linear regulator and the charge pump are coupled to the display panel respectively. The synchronous dual mode boost DC-DC converter is selectively operated in a pulse width modulation mode or a pulse frequency modulation mode according to a control signal. In the pulse width modulation mode, the synchronous dual mode boost DC-DC converter controls the linear regulator to generate a first voltage signal to the display panel. In the pulse frequency modulation mode, the synchronous dual mode boost DC-DC converter controls the charge pump to generate a second voltage signal to the display panel.

In an embodiment, a voltage level of the first voltage signal is higher than a voltage level of the second voltage signal.

In an embodiment, the bias generation circuit is coupled to a logic controller and receives the control signal from the logic controller.

In an embodiment, when the synchronous dual mode boost DC-DC converter receives the control signal, the synchronous dual mode boost DC-DC converter determines whether the control signal indicates a normal mode or an idle mode.

In an embodiment, when the control signal indicates the normal mode, the synchronous dual mode boost DC-DC converter enters into the pulse width modulation (PWM) mode; when the control signal indicates the idle mode, the synchronous dual mode boost DC-DC converter enters into the pulse frequency modulation (PFM) mode.

In an embodiment, when the control signal is switched from the normal mode to the idle mode, the synchronous dual mode boost DC-DC converter delays a first period of time and then switched from the pulse width modulation (PWM) mode to the pulse frequency modulation (PFM) mode.

In an embodiment, during the second period of time, an output voltage of the synchronous dual mode boost DC-DC converter is gradually increased from a first voltage level to a second voltage level; after the second period of time, the synchronous dual mode boost DC-DC converter is switched from the pulse frequency modulation (PFM) mode to the pulse width modulation (PWM) mode, and the output voltage is gradually decreased from the second voltage level to the first voltage level.

In an embodiment, during the second period of time, a compensation signal of the synchronous dual mode boost DC-DC converter is pre-charged to a default voltage level; after the second period of time, the synchronous dual mode boost DC-DC converter is switched from the pulse frequency modulation (PFM) mode to the pulse width modulation (PWM) mode, and the compensation signal is gradually decreased from the default voltage level.

In an embodiment, the synchronous dual mode boost DC-DC converter comprises a pulse width modulation controller and a pulse frequency modulation controller; when the synchronous dual mode boost DC-DC converter is operated in the pulse width modulation (PWM) mode, the synchronous dual mode boost DC-DC converter switches off the pulse frequency modulation controller; when the synchronous dual mode boost DC-DC converter is operated in the pulse frequency modulation (PFM) mode, the synchronous dual mode boost DC-DC converter switches off the pulse width modulation controller.

Another embodiment of the disclosure is a synchronous dual mode boost DC-DC converter. In this embodiment, the synchronous dual mode boost DC-DC converter is disposed in a bias generation circuit. The bias generation circuit includes a linear regulator and a charge pump. The linear regulator and the charge pump are coupled to a display panel respectively. The synchronous dual mode boost DC-DC converter includes an input terminal, an output terminal, a processing circuit, a pulse width modulation controller and a pulse frequency modulation controller. The input terminal is used for receiving a control signal. The output terminal is coupled to the linear regulator and the charge pump respectively. The processing circuit is coupled between the input terminal and the output terminal and used for selectively operating in a pulse width modulation (PWM) mode or a pulse frequency modulation (PFM) mode according to the control signal. The pulse width modulation controller is coupled to the processing circuit. The pulse frequency modulation controller is coupled to the processing circuit. When in the pulse width modulation mode, the synchronous dual mode boost DC-DC converter switches off the pulse frequency modulation controller and outputs an output voltage through the output terminal to control the linear regulator to generate a first voltage signal to the display panel. When in the pulse frequency modulation mode, the synchronous dual mode boost DC-DC converter switches off the pulse width modulation controller and outputs the output voltage through the output terminal to control the charge pump to generate a second voltage signal to the display panel.

Compared to the prior art, the bias generation circuit and synchronous dual mode boost DC-DC converter thereof disclosed can be switched to PWM mode under the normal mode and switched to PFM mode under the idle mode according to the control signal, and the bias generation circuit and synchronous dual mode boost DC-DC converter thereof in the disclosure can also avoid undershoot and overshoot of the voltage signal provided to the display panel when switching from the idle mode to the normal mode in the prior art. Therefore, no charge pump is necessary in the source driver to provide voltage signal to the display panel, so that the cost can be reduced.

The advantage and spirit of the disclosure may be understood by the following detailed descriptions together with the appended drawings.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

A preferred embodiment of the disclosure is a bias generation circuit. In this embodiment, the bias generation circuit is coupled to a display panel (e.g., OLED display panel, but not limited to this). No matter the display panel is operated in the normal mode or in the idle mode, it is the bias generation circuit, not the source driver, providing power to the display panel. Therefore, no charge pump is necessary in the source driver to provide voltage signal to the display panel, so that the cost can be reduced.

Figure 1:
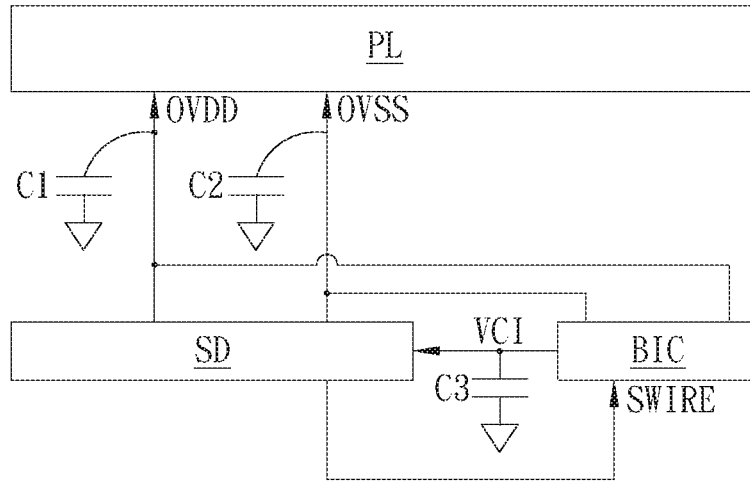
FIG. 1 illustrates a schematic diagram of the bias integrated circuit BIC providing power to the OLED display panel PL in the normal mode and the source driver providing power to the OLED display panel PL in the idle mode.
Figure 2:
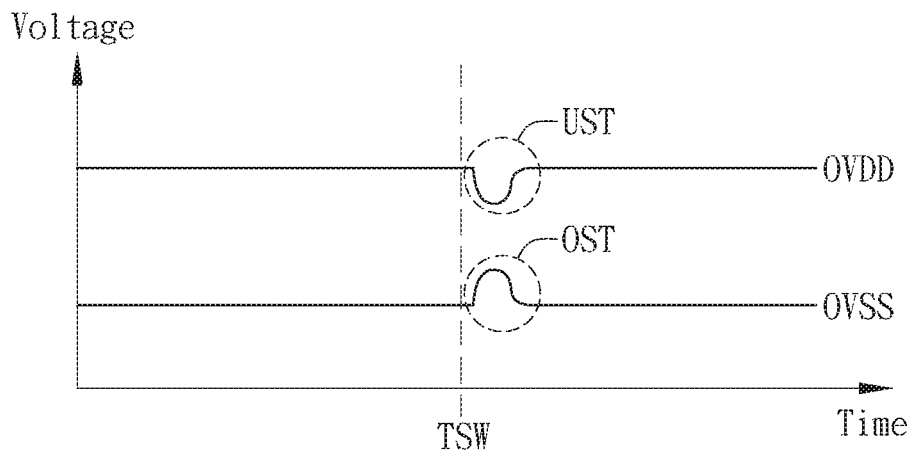
FIG. 2 illustrates a schematic diagram that when the normal mode is switched to the idle mode, the bias integrated circuit BIC is switched to the source driver to provide power to the OLED display panel PL, and the voltage signal OVDD provided to the OLED display panel PL may be affected to have undershoot and the voltage signal OVSS provided to the OLED display panel PL may be affected to have overshoot.
Figure 3:
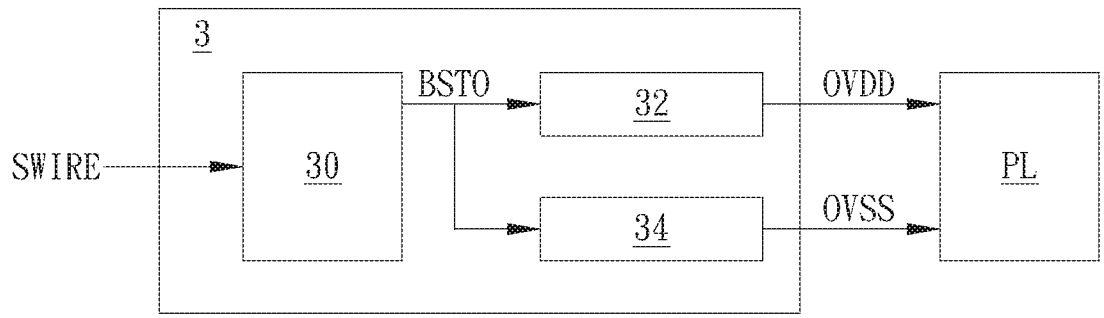
FIG. 3 illustrates a functional block diagram of the bias generation circuit in an embodiment of the disclosure.

Please refer to FIG. 3. FIG. 3 illustrates a functional block diagram of the bias generation circuit 3 in this embodiment. As shown in FIG. 3, the bias generation circuit 3 includes a synchronous dual mode boost DC-DC converter 30, a linear regulator 32 and a charge pump 34. The linear regulator 32 and the charge pump 34 are coupled to the display panel PL respectively. The synchronous dual mode boost DC-DC converter 30 is coupled to the linear regulator 32 and the charge pump 34 respectively.

When the synchronous dual mode boost DC-DC converter 30 receives a control signal SWIRE, the synchronous dual mode boost DC-DC converter 30 will be selectively operated in a pulse width modulation mode or a pulse frequency modulation mode according to the control signal SWIRE. In practical applications, the control signal SWIRE can be transmitted from the source driver and then transmitted into the synchronous dual mode boost DC-DC converter 30 through the logic controller, but not limited to this.

In detail, when the synchronous dual mode boost DC-DC converter 30 receives the control signal SWIRE, the synchronous dual mode boost DC-DC converter 30 will determine whether the control signal SWIRE indicates the normal mode or the idle mode. In an embodiment, the synchronous dual mode boost DC-DC converter 30 can determine whether the control signal SWIRE indicates the normal mode or the idle mode according to the control signal SWIRE having high voltage level or low voltage level. For example, if the control signal SWIRE has high voltage level, it means that the control signal SWIRE indicates the normal mode; if the control signal SWIRE has low voltage level, it means that the control signal SWIRE indicates the idle mode, but not limited to this.

If the synchronous dual mode boost DC-DC converter 30 determines that the control signal SWIRE indicates the normal mode, then the synchronous dual mode boost DC-DC converter 30 will enter into the pulse width modulation (PWM) mode; if the synchronous dual mode boost DC-DC converter 30 determines that the control signal SWIRE indicates the idle mode, then the synchronous dual mode boost DC-DC converter 30 will enter into the pulse frequency modulation (PFM) mode.

After the synchronous dual mode boost DC-DC converter 30 enters into the pulse width modulation mode, the synchronous dual mode boost DC-DC converter 30 will control the linear regulator 32 to generate a first voltage signal OVDD to the display panel PL; after the synchronous dual mode boost DC-DC converter 30 enters into the pulse frequency modulation mode, the synchronous dual mode boost DC-DC converter 30 will control the charge pump 34 to generate a second voltage signal OVSS to the display panel PL.

In practical applications, the voltage level of the first voltage signal OVDD will be higher than the voltage level of the second voltage signal OVSS. For example, the first voltage signal OVDD can be the operating voltage and the second voltage signal OVSS can be the ground voltage, but not limited to this.

Figure 4:
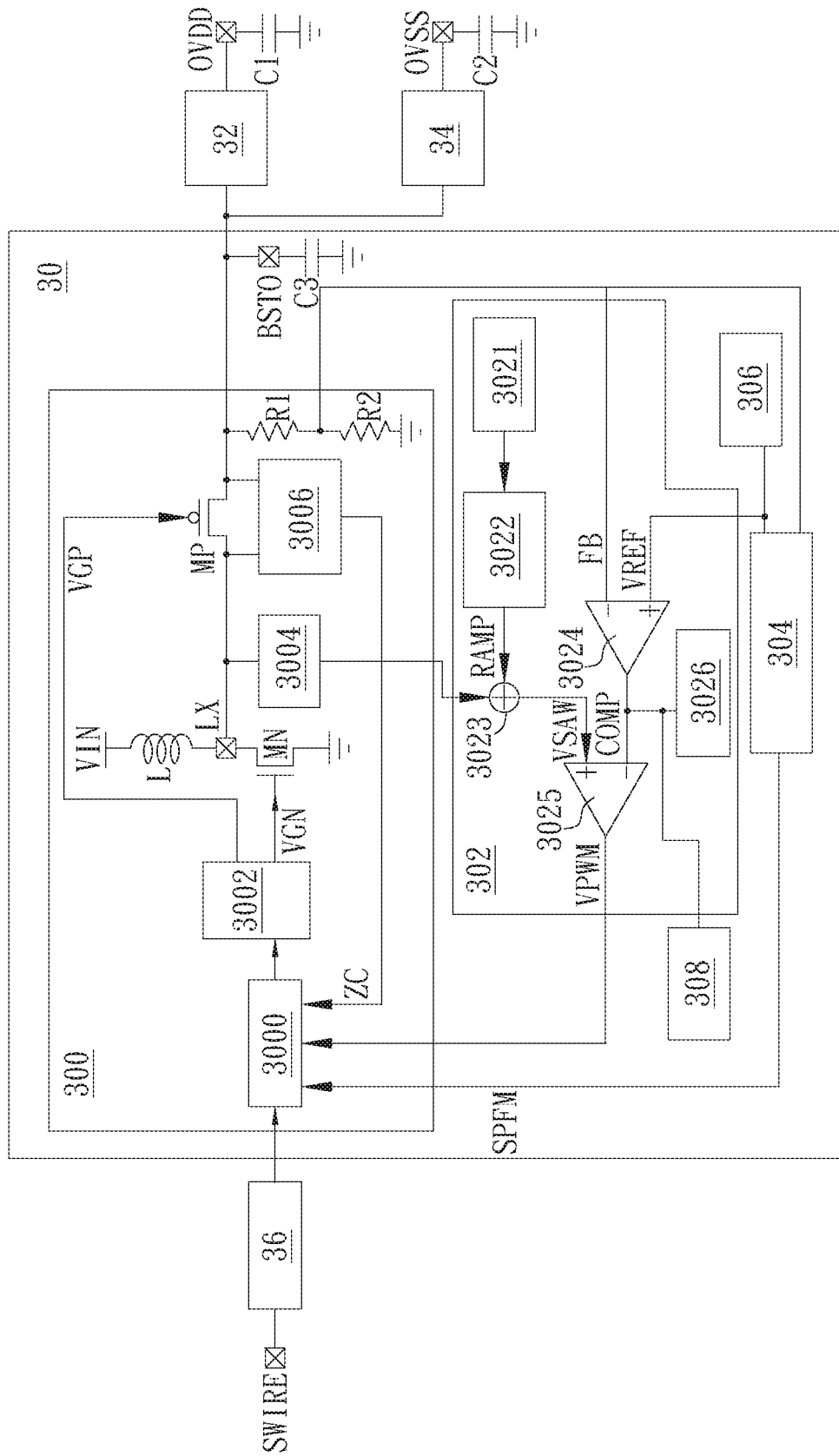
FIG. 4 illustrates a schematic diagram of detailed circuit structure of the synchronous dual mode boost DC-DC converter in the bias generation circuit.

Please also refer to FIG. 4. FIG. 4 illustrates a schematic diagram of detailed circuit structure of the synchronous dual mode boost DC-DC converter 30 in the bias generation circuit 3.

As shown in FIG. 4, the input terminal of the synchronous dual mode boost DC-DC converter 30 is coupled to the logic controller 36; the output terminal of the synchronous dual mode boost DC-DC converter 30 is coupled to the linear regulator 32 and the charge pump 34 respectively; the capacitor C1 is coupled between the output terminal of the linear regulator 32 and the ground terminal; the capacitor C2 is coupled between the output terminal of the charge pump 34 and the ground terminal.

The synchronous dual mode boost DC-DC converter 30 can include a processing circuit 300, a PWM controller 302, a PFM controller 304, a reference voltage generation unit 306 and a pre-charging unit 308. The processing circuit 300 is coupled between the input terminal and the output terminal of the synchronous dual mode boost DC-DC converter 30; the PWM controller 302 and the PFM controller 304 are coupled to the processing circuit 300 respectively; the reference voltage generation unit 306 is coupled to the PWM controller 302 and the PFM controller 304 respectively; the pre-charging unit 308 is coupled to the PWM controller 302.

In this embodiment, the processing circuit 300 can include a multiplexer 3000, a buffer 3002, a current sensor 3004, a zero current detector 3006, a N-type transistor MN, a P-type transistor MP, an inductor L and resistors R1-R2 coupled in series. The PWM controller 302 includes an oscillator 3021, a ramp generator 3022, an adder 3023, an error amplifier 3024, a comparator 3025 and a compensating unit 3026.

The multiplexer 3000 is coupled between the logic controller 36 and the buffer 3002; the buffer 3002 is coupled to the multiplexer 3000, the gate of the N-type transistor MN and the gate of the P-type transistor MP respectively; the multiplexer 3000 outputs gate control signals VGN and VGP to the gate of the N-type transistor MN and the gate of the P-type transistor MP through the buffer 3002 respectively to control the operation of the N-type transistor MN and the P-type transistor MP; the inductor L and the N-type transistor MN are coupled in series between the input voltage VIN and the ground terminal; the node LX is between the inductor L and the N-type transistor MN; one terminal of the current sensor 3004 is coupled between the node LX and the node LX and another terminal of the current sensor 3004 is coupled to the adder 3023; the current sensor 3004 senses the sensing current flowing from the node LX to the P-type transistor MP and provides it to the adder 3023; the zero current detector 3006 is coupled to the source and drain of the P-type transistor MP and the multiplexer 3000 and provides the zero current detection signal ZC to the multiplexer 3000; the capacitor C3 is coupled between the output terminal of the synchronous dual mode boost DC-DC converter 30 and the ground terminal.

The PWM controller 302 is used to provide the pulse width modulation signal VPWM to the multiplexer 3000 in the PWM mode. The oscillator 3021 is coupled to the ramp generator 3022; the ramp generator 3022 is coupled to the adder 3023 and generates the ramp signal RAMP to the adder 3023; the adder 3023 is coupled to the positive input terminal + of the comparator 3025 and provides the voltage signal VSAW to the positive input terminal + of the comparator 3025 according to the sensing current of the current sensor 3004 and the ramp signal RAMP of the ramp generator 3022; the positive input terminal + of the error amplifier 3024 is coupled between the reference voltage generation unit 306 and the PFM controller 304 and receives the reference voltage VREF from the reference voltage generation unit 306; the negative input terminal − of the error amplifier 3024 is coupled between the resistors R1 and R2 coupled in series and receives a feedback voltage FB between the resistors R1 and R2; the positive input terminal + of the comparator 3025 is coupled to the adder 3023 and receives the voltage signal VSAW; the negative input terminal − of the comparator 3025 is coupled to the output terminal of the error amplifier 3024, the compensation unit 3026 and the pre-charging unit 308 respectively and receives the compensation signal COMP, and the compensation signal COMP can include the output of the error amplifier 3024, the compensation unit 3026 and the pre-charging unit 308; the output terminal of the comparator 3025 is coupled to the multiplexer 3000 and provides the pulse width modulation signal VPWM to the multiplexer 3000 according to the voltage signal VSAW and the compensation signal COMP; the compensation unit 3026 is coupled to the negative input terminal − of the comparator 3025; the pre-charging unit 308 is coupled to the negative input terminal − of the comparator 3025; the reference voltage generation unit 306 is coupled to the positive input terminal + of the error amplifier 3024 and the PFM controller 304 respectively; the PFM controller 304 is coupled to the multiplexer 3000, the reference voltage generation unit 306 and between the resistors R1 and R2 respectively and used for providing the pulse frequency modulation signal SPFM to the multiplexer 3000 according to the feedback voltage FB between the resistors R1 and R2 and the reference voltage VREF of the reference voltage generation unit 306 under the pulse frequency modulation mode PFM.

Figure 5:
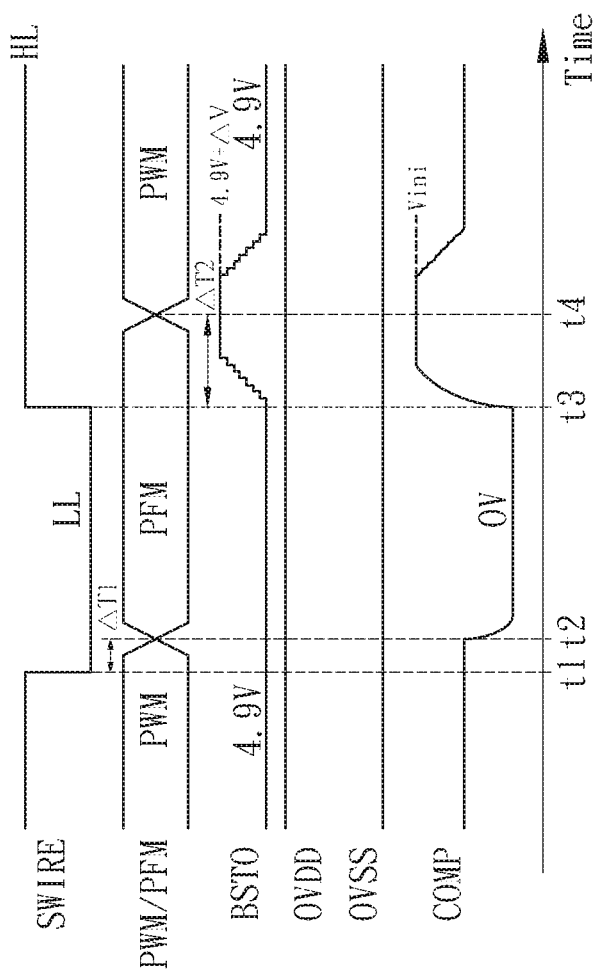
FIG. 5 illustrates timing diagrams of the signals in FIG. 3 and FIG. 4.

Please refer to FIG. 5. FIG. 5 illustrates timing diagrams of the signals in FIG. 3 and FIG. 4. As shown in FIG. 5, at the time t1, the control signal SWIRE is changed from high voltage level HL to low voltage level LL. That is to say, the operation mode indicated by the control signal SWIRE is changed from the normal mode to the idle mode. It should be noticed that the synchronous dual mode boost DC-DC converter 30 will not change from the pulse width modulation mode PWM to the pulse frequency modulation mode PFM at the time t1. The synchronous dual mode boost DC-DC converter 30 will delay a first period of time ΔT1 and then change from the pulse width modulation mode PWM to the pulse frequency modulation mode PFM at the time t2. In addition, during the first period of time ΔT1, the output voltage BSTO, the first voltage signal OVDD, the second voltage signal OVSS and the compensation signal COMP are maintained unchanged. When the synchronous dual mode boost DC-DC converter 30 changes from the pulse width modulation mode PWM to the pulse frequency modulation mode PFM at the time t2, the synchronous dual mode boost DC-DC converter 30 will stop the operation of the PWM controller 302 and start the operation of the PFM controller 304. At this time, the voltage level of the compensation signal COMP will be decreased to 0(V), but the output voltage BSTO, the first voltage signal OVDD and the second voltage signal OVSS are still the same.

At the time t3, the control signal SWIRE is changed from low voltage level LL to high voltage level HL. That is to say, the operation mode indicated by the control signal SWIRE is changed from the idle mode to the normal mode. At this time, the synchronous dual mode boost DC-DC converter 30 will delay a second period of time ΔT2 and then change from the pulse frequency modulation mode PFM to the pulse width modulation mode PWM at the time t4. As this time, the synchronous dual mode boost DC-DC converter 30 will stop the operation of the PFM controller 304 and start the operation of the PWM controller 302.

During the second period of time ΔT2, the output voltage BSTO of the synchronous dual mode boost DC-DC converter 30 will be gradually increased from the original unchanged first voltage level (e.g., 4.9V) to the second voltage level (e.g., 4.9V+ΔV) and then maintained at the second voltage level. After the time t4, the synchronous dual mode boost DC-DC converter 30 is changed from the pulse frequency modulation mode PFM to the pulse width modulation mode PWM, the output voltage BSTO will be gradually decreased from the second voltage level (e.g., 4.9V+ΔV) to the first voltage level (e.g., 4.9V) and then maintained at the first voltage level.

It should be noticed that the output voltage BSTO can gradually increase from the first voltage level to the second voltage level in a step form as shown in FIG. 5, but not limited to this. Similarly, the output voltage BSTO can gradually decrease from the second voltage level to the first voltage level in the step form as shown in FIG. 5, but not limited to this.

During the second period of time ΔT2, the compensation signal COMP of the synchronous dual mode boost DC-DC converter 30 will be pre-charged by the pre-charging unit 308 from 0(V) to a default voltage level Vini and maintained at the default voltage level Vini. After the time t4, the synchronous dual mode boost DC-DC converter 30 is changed from the pulse frequency modulation mode PFM to the pulse width modulation mode PWM, the compensation signal COMP will be gradually decreased from the default voltage level Vini to the original voltage level before the time t2.

As to the first voltage signal OVDD and the second voltage signal OVSS outputted by the bias generation circuit 3 to the display panel PL, they will be maintained unchanged all the time; that is to say, the voltage level of the first voltage signal OVDD and the second voltage signal OVSS outputted by the bias generation circuit 3 to the display panel PL will not affected by the switching between the normal mode and the idle mode; therefore, stable power supply can be maintained. In addition, in order to increase the transformation efficiency in the pulse frequency modulation mode PFM, the bias generation circuit 3 of the disclosure can switch off the N-type transistor MN and the P-type transistor MP through the gate control signals VGN and VGP, but not limited to this.

Above all, in the pulse width modulation mode PWM, the synchronous dual mode boost DC-DC converter 30 will switch off the PFM controller 304 and control the linear regulator 32 to generate the first voltage signal OVDD to the display panel PL; in the pulse frequency modulation mode PFM, the synchronous dual mode boost DC-DC converter 30 will switch off the PWM controller 302 and control the charge pump 34 to generate the second voltage signal OVSS to the display panel PL.

Compared to the prior arts, the bias generation circuit and synchronous dual mode boost DC-DC converter thereof in the disclosure can be switched to PWM mode under the normal mode and switched to PFM mode under the idle mode according to the control signal, and the bias generation circuit and synchronous dual mode boost DC-DC converter thereof in the disclosure can also avoid undershoot and overshoot of the voltage signal provided to the display panel when switching from the idle mode to the normal mode in the prior art. Therefore, no charge pump is necessary in the source driver to provide voltage signal to the display panel, so that the cost can be reduced.

With the example and explanations above, the features and spirits of the disclosure will be hopefully well described. Those skilled in the art will readily observe that numerous modifications and alterations of the device may be made while retaining the teaching of the disclosure. Accordingly, the above disclosure should be construed as limited only by the metes and bounds of the appended claims.

What is claimed is:

1. A bias generation circuit, coupled to a display panel, comprising:
    a linear regulator, coupled to the display panel;
    a charge pump, coupled to the display panel; and
    a synchronous dual mode boost DC-DC converter, coupled to the linear regulator and the charge pump respectively, when the synchronous dual mode boost DC-DC converter receives a control signal, the synchronous dual mode boost DC-DC converter selectively operating in a pulse width modulation (PWM) mode or a pulse frequency modulation (PFM) mode according to the control signal;
    wherein in the pulse width modulation mode, the synchronous dual mode boost DC-DC converter controls the linear regulator to generate a first voltage signal to the display panel; in the pulse frequency modulation mode, the synchronous dual mode boost DC-DC converter controls the charge pump to generate a second voltage signal to the display panel;
    when the synchronous dual mode boost DC-DC converter receives the control signal, the synchronous dual mode boost DC-DC converter determines whether the control signal indicates a normal mode or an idle mode;
    when the control signal indicates the normal mode, the synchronous dual mode boost DC-DC converter enters into the pulse width modulation (PWM) mode; when the control signal indicates the idle mode, the synchronous dual mode boost DC-DC converter enters into the pulse frequency modulation (PFM) mode;
    when the control signal is switched from the idle mode to the normal mode, the synchronous dual mode boost DC-DC converter delays a second period of time and then switches from the pulse frequency modulation (PFM) mode to the pulse width modulation (PWM) mode;
    during the second period of time, an output voltage of the synchronous dual mode boost DC-DC converter is gradually increased from a first voltage level to a second voltage level; after the second period of time, the synchronous dual mode boost DC-DC converter is switched from the pulse frequency modulation (PFM) mode to the pulse width modulation (PWM) mode, and the output voltage is gradually decreased from the second voltage level to the first voltage level.

2. The bias generation circuit of claim 1, wherein a voltage level of the first voltage signal is higher than a voltage level of the second voltage signal.

3. The bias generation circuit of claim 1, wherein the bias generation circuit is coupled to a logic controller and receives the control signal from the logic controller.

4. The bias generation circuit of claim 1, wherein when the control signal is switched from the normal mode to the idle mode, the synchronous dual mode boost DC-DC converter delays a first period of time and then switches from the pulse width modulation (PWM) mode to the pulse frequency modulation (PFM) mode.

5. A bias generation circuit, coupled to a display panel, comprising:
   a linear regulator, coupled to the display panel;
   a charge pump, coupled to the display panel; and
   a synchronous dual mode boost DC-DC converter, coupled to the linear regulator and the charge pump respectively, when the synchronous dual mode boost DC-DC converter receives a control signal, the synchronous dual mode boost DC-DC converter selectively operating in a pulse width modulation (PWM) mode or a pulse frequency modulation (PFM) mode according to the control signal;
   wherein in the pulse width modulation mode, the synchronous dual mode boost DC-DC converter controls the linear regulator to generate a first voltage signal to the display panel; in the pulse frequency modulation mode, the synchronous dual mode boost DC-DC converter controls the charge pump to generate a second voltage signal to the display panel;
   when the synchronous dual mode boost DC-DC converter receives the control signal, the synchronous dual mode boost DC-DC converter determines whether the control signal indicates a normal mode or an idle mode;
   when the control signal indicates the normal mode, the synchronous dual mode boost DC-DC converter enters into the pulse width modulation (PWM) mode; when the control signal indicates the idle mode, the synchronous dual mode boost DC-DC converter enters into the pulse frequency modulation (PFM) mode;
   when the control signal is switched from the idle mode to the normal mode, the synchronous dual mode boost DC-DC converter delays a second period of time and then switches from the pulse frequency modulation (PFM) mode to the pulse width modulation (PWM) mode;
   during the second period of time, a compensation signal of the synchronous dual mode boost DC-DC converter is pre-charged to a default voltage level; after the second period of time, the synchronous dual mode boost DC-DC converter is switched from the pulse frequency modulation (PFM) mode to the pulse width modulation (PWM) mode, and the compensation signal is gradually decreased from the default voltage level.

6. The bias generation circuit of claim 1, wherein the synchronous dual mode boost DC-DC converter comprises a pulse width modulation controller and a pulse frequency modulation controller; when the synchronous dual mode boost DC-DC converter is operated in the pulse width modulation (PWM) mode, the synchronous dual mode boost DC-DC converter switches off the pulse frequency modulation controller; when the synchronous dual mode boost DC-DC converter is operated in the pulse frequency modulation (PFM) mode, the synchronous dual mode boost DC-DC converter switches off the pulse width modulation controller.

* * * * *